Dec. 30, 1952 C. DE BOISMAISON WHITE 2,624,016

ELECTRIC TRIGGER CIRCUITS

Filed Aug. 24, 1951

Inventor
CHARLES DE B. WHITE
By Philip M. Bolton
Attorney

Patented Dec. 30, 1952 2,624,016

UNITED STATES PATENT OFFICE 2,624,016

ELECTRIC TRIGGER CIRCUITS

Charles de Boismaison White, London, England, assignor to International Standard Electric Corporation, New York, N. Y., a corporation of Delaware Application August 24, 1951, Serial No. 243,557
In Great Britain August 25, 1950

3 Claims. (Cl. 307—88)

The present invention relates to electric two-condition or trigger circuits employing amplifying devices which include semi-conductors such as germanium crystals.

An amplifying device has been proposed which comprises a crystal of germanium or other suitable semi-conductor which is provided with a base electrode making a low resistance non-rectifying contact over a large area of the crystal surface, and at least two other electrodes called the emitter and collector electrodes making rectifying contact with the crystal surface. Such a device has been called a "crystal triode," although it may have more than three electrodes. Generally the rectifying electrodes have been constructed of fine sharply pointed wires called "cat's whiskers" which are placed in contact with the crystal surface.

A number of circuits have already been proposed including a crystal triode and one or more capacitors and resistors arranged to form two-condition circuits which can be switched from one condition to the other by the application of suitable electric pulses. Such circuits have a number of useful applications, such for example, as in binary counting chains. The circuits hitherto proposed have, however, usually involved rather critical biassing arrangements, and have tended to be unstable in operation as a consequence.

The principal object of the present invention is to simplify trigger circuits of this kind and to render them independent of critical biassing or other inconvenient adjustments.

This object is achieved according to the invention by providing an electric two-condition trigger circuit comprising a crystal triode conditioned in such manner that the characteristic curve relating the collector current to the emitter current is of the hysteresis type, means for biassing the emitter electrode in such manner as to produce an emitter current corresponding to which the collector current can have either one of two different values, and means for applying a triggering pulse to the emitter electrode for switching the collector current from one to the other of the said two different values.

Semiconductors can be of two types, namely N-type, in which conduction of the current is due to a few extra electrons; and P-type, in which it is due to deficiencies of electrons called "positive holes" which migrate as though they were electrons with a positive charge.

The invention will be explained with reference to the accompanying drawing in which.

Figure 1:
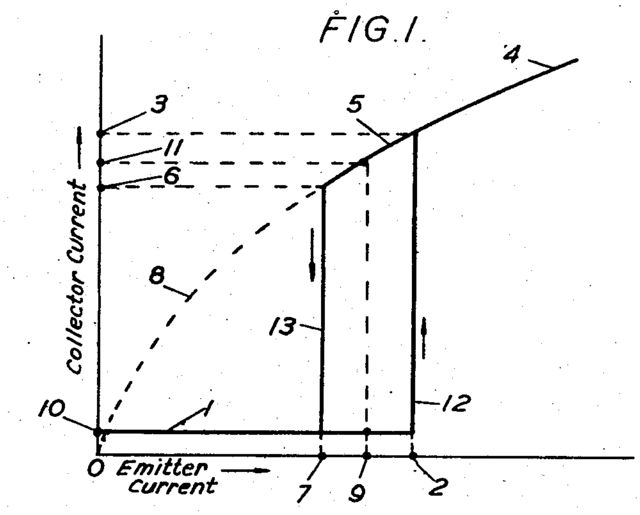
Fig. 1 shows characteristic curves of a crystal triode.

In the copending application of A. T. Starr-C. de B. White-N. S. Cinderey, Serial No. 228,486, filed May 26, 1951, there is described a crystal triode in which the usual cat's whisker electrodes are replaced by metal electrodes of appreciable area produced by depositing thin metal films on the surface of the germanium. In the copending application of C. de B. White-K. A. Matthews, Serial No. 152,302, filed March 28, 1950, a crystal triode is described having a control electrode additional to the usual emitter and collector electrodes. By suitably polarising the control electrode with respect to the base electrode, the characteristic curve of the crystal triode may be controlled.

In the copending application of Matthews-White, Serial No. 150,412, filed March 18, 1950, a process of electroforming a crystal triode is described. The purpose of the process is to obtain a crystal triode which produces a current gain. This process involves observing the current-voltage characteristic measured between the collector and emitter electrodes.

Before the electroforming process is applied, the characteristic curve usually shows a loop, a portion of which has a negative slope, and the forming process is complete when the loop has disappeared, the characteristic then having no portion with a negative slope.

The applicant has discovered that the operation of an incompletely electroformed crystal triode, in which the above-mentioned characteristic includes a portion with a negative slope, shows hysteresis or discontinuous effects. Thus, the curve followed by the collector current when the emitter current is increasing is different from the curve followed when the emitter current is decreasing.

It has been found that when the crystal triode is in the right condition to produce a hysteresis characteristic, the magnitude of the hysteresis effect may be controlled by the use of an additional suitably polarised control electrode as described in the specification of application No. 152,302/50 already referred to.

It has been further found that the best results are obtained by the use of electrodes in the form of metal films deposited on the surface of the germanium crystal, because experience has shown that crystal triodes of this type generally exhibit larger hysteresis effects than those in which cat's whisker electrodes are used, and in such triodes it is more difficult to complete the electroforming process for the elimination of the negative slope position of the characteristic referred to above.

It is important to note that in plating the electrodes on the surface of the semi-conductor (assuming that N-type germanium is used), the germanium surface should first be etched with an alkaline solution and then the electrodes should be plated on from an alkaline copper plating solution containing a small quantity of arsenic to serve as the donor impurity necessary for electroforming the germanium.

The spacing between the control electrode and each of the other electrodes should be from 0.005 to 0.015 inch.

According to the usual practice, the emitter or input electrode should be polarised by a fraction of a volt with respect to the base electrode in the forward or low-resistance direction, and the collector electrode should be polarised by several volts (say 5 to 30 volts) with respect to the base electrode in the reverse or high resistance direction. The control electrode (which should be arranged near the emitter electrode) should be polarised by a few volts in the forward direction. In these circumstances, a characteristic curve such as that shown in Fig. 1 will be obtained. In this curve the abscissae are the emitter currents and the ordinates are the corresponding collector currents.

When the emitter current is zero, a small collector current flows, and remains substantially constant as the emitter current increases from zero, as indicated by the portion 1 of the full-line curve, until the emitter current reaches the value corresponding to the abscissae 2, when the collector current increases suddenly to a much larger value represented by the ordinate 3. As the emitter current increases further the portion 4 of the curve is followed. If now the emitter current is decreased to zero, the collector current decreases smoothly below the value corresponding to the ordinate 3, following the portion 5 of the curve. When a value corresponding to the ordinate 6 is reached, which corresponds to an emitter current represented by the abscissae 7, less than the current corresponding to 2, the collector current suddenly decreases to the original small value, and then follows the curve 1.

The application of the hysteresis characteristic may be explained as follows:

Let the emitter electrode be initially biassed at a current corresponding to a point 9, approximately halfway between points 2 and 7. It will be seen that there are two possible alternative values of the collector current, represented by the points 10 and 11. Suppose that the crystal triode is in the condition corresponding to the point 10. Then let a short pulse be applied to the emitter electrode of such polarity and amplitude as momentarily to increase the emitter current beyond the value 2. The effect will be to switch the collector current up the portion 12 of the curve, and it will then stabilise at the higher value 11 after the disappearance of the pulse. Suppose now a pulse of opposite polarity be applied to the emitter electrode of sufficient amplitude momentarily to reduce the emitter current below the value 7. This will switch the collector current down the portion 13 of the curve and it will then stabilise again at the low value 10. This process can be continued indefinitely, and it will be seen that a very simple two-condition arrangement is produced without the aid of any external circuit elements beyond those necessary for biassing the device. It should be noted also that the difference between the current values 2 and 7 can easily be made quite large (e. g. perhaps 50% of the value 2), and so the bias corresponding to the point 9 is not at all critical, and a large drift of the bias current can be allowed to occur before the device fails to operate.

Figure 2:
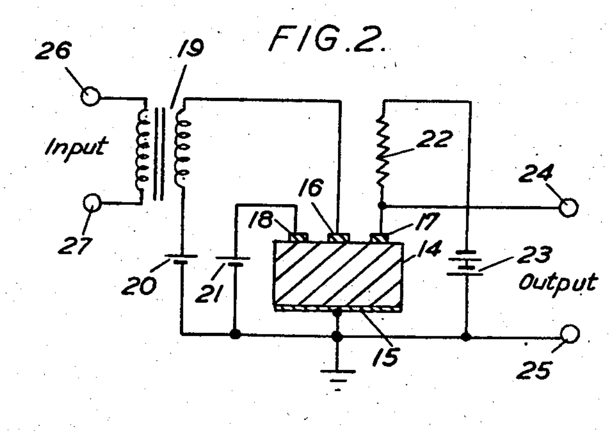
Fig. 2 shows an example of a trigger circuit according to the invention.

Fig. 2 shows an example of a trigger circuit operating in the manner which has just been explained. The crystal triode comprises a germanium crystal 14 (assumed to be of the N-type) having a base electrode 15 making a low resistance non-rectifying contact over the large area of the crystal. On the upper surface of the crystal are deposited three metal film electrodes, namely an emitter electrode 16, a collector electrode 17 and a control electrode 18. The emitter electrode 16 is connected to the base electrode 15 through the secondary winding of an input transformer 19, and a positive bias source 20 having a potential of perhaps 0.5 volt. The control electrode is connected to the base electrode 15 through a positive bias source 21 having a potential of perhaps 0.75 to 2 volts. The collector electrode 17 is connected to the base electrode 15 through a load resistance 22 and a negative bias source 23 having a potential of, say, from 5 to 30 volts. A pair of output terminals 24 and 25 are connected respectively to the collector and base electrodes 17 and 15. A source of triggering pulses (not shown) is intended to be connected to terminals 26 and 27 connected to the primary winding of the input transformer 19.

The potential of the bias source 21 should be adjusted until the desired hysteresis curve is produced. The current drawn by the control electrode will probably be within the range 3 to 12 milliamperes.

The potential of the bias source 20 should be adjusted so that in the absence of any input pulses, the emitter current has a value 9 (Fig. 1) which is approximately equal to the mean of the values 2 and 7. It will be seen that the potential of the output terminal 24 with respect to the output terminal 25 will depend on whether the device is in the high current or low current condition, and can be applied to operate a succeeding counting stage (not shown) or any other device in some suitable way. As alternately positive and negative trigger pulses are supplied to terminals 26 and 27, so the device will be triggered backwards and forwards between the high current and low current conditions.

The arrangement shown in Fig. 2 gives one very simple example of the application of the invention, and those skilled in the art will easily appreciate how to adapt the circuit for particular requirements. The sources 20, 21 and 23 are only diagrammatically shown as batteries, and it is intended that suitable biassing potentials, adjustable if need be, will be provided in any convenient way. It will be understood that P-type germanium could be used instead of arsenic in the plating solution.

It should be pointed out that the control electrode 18 is not essential and could be omitted, together with the corresponding source 21. Furthermore, catswhisker electrodes could be used, if desired, instead of plated-on electrodes.

While the principles of the invention have been described above in connection with specific embodiments, and particular modifications thereof, it is to be clearly understood that this description is made by way of example and not as a limitation on the scope of the invention.

What I claim is:

1. An electric two-condition trigger circuit comprising a crystal triode; said triode comprising an emitter electrode, a collector electrode and a control electrode; means for biasing said control electrode to produce a hysteresis loop in the characteristic curve of said triode, the characteristic curve being formed by plotting the collector current against emitter current; means for biasing the emitter electrode to a value falling within the loop, whereby the collector current has two possible values; and means for applying a triggering pulse of given polarity to said emitter electrode to switch the collector current from one value to the other.

2. The trigger circuit according to claim 1, wherein said crystal triode comprises a body of semiconducting material having a base electrode making a low resistance non-rectifying contact therewith.

3. The trigger circuit according to claim 2, wherein each of said electrodes comprises a metal film making rectifying contact with the semi-conducting material.

CHARLES DE BOISMAISON WHITE.

REFERENCES CITED

The following references are of record in the file of this patent:

UNITED STATES PATENTS

| Number | Name | Date |
|---|---|---|
| 2,533,001 | Eberhard | Dec. 5, 1950 |
| 2,569,345 | Shea | Sept. 25, 1951 |